United States Patent
Kihara

(10) Patent No.: US 7,952,520 B2
(45) Date of Patent: May 31, 2011

(54) DVOR MONITOR DEVICE, AND DVOR MONITOR METHOD

(75) Inventor: Hiroki Kihara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/302,293

(22) PCT Filed: Aug. 31, 2007

(86) PCT No.: PCT/JP2007/067054
§ 371 (c)(1),
(2), (4) Date: Nov. 25, 2008

(87) PCT Pub. No.: WO2008/032592
PCT Pub. Date: Mar. 20, 2008

(65) Prior Publication Data
US 2009/0174602 A1  Jul. 9, 2009

(30) Foreign Application Priority Data
Sep. 14, 2006  (JP) .................................. 2006-249910

(51) Int. Cl.
*G01S 1/00* (2006.01)
(52) U.S. Cl. ......................................... 342/405; 342/385
(58) Field of Classification Search .................. 342/385, 342/401, 402, 404, 405
See application file for complete search history.

(56) References Cited

U.S. PATENT DOCUMENTS 5,045,859 A * 9/1991 Yetter ............................ 342/414
5,172,124 A   12/1992 Becavin et al.

FOREIGN PATENT DOCUMENTS

| JP | 1 114771  | 5/1989  |
|----|-----------|---------|
| JP | 2-304384  | 12/1990 |
| JP | 4 35715   | 6/1992  |
| JP | 4 290969  | 10/1992 |
| JP | 6 167559  | 6/1994  |

OTHER PUBLICATIONS

Office Action issued Nov. 2, 2010, in Japanese Patent Application No. 2006-249910 (with English translation).

* cited by examiner

*Primary Examiner* — Dao L Phan
(74) *Attorney, Agent, or Firm* — Oblon, Spivak, McClelland, Maier & Neustadt, L.L.P.

(57) ABSTRACT

A monitor antenna receives radio waves transmitted from a Doppler very high frequency omnidirectional radio range (DVOR) device and includes a carrier signal and a subcarrier signal, orthogonal detectors shift a phase of a signal of each subcarrier component by a phase difference equivalent to a prescribed distance away from the DVOR apparatus relative to a signal of a carrier component, and a combiner combines signals of the carrier component and the subcarrier component to output the combined signal to a DVOR demodulator.

3 Claims, 2 Drawing Sheets

DVOR MONITOR DEVICE, AND DVOR MONITOR METHOD

CROSS-REFERENCE TO PRIORITY APPLICATIONS

The present application is the U.S. National Phase Application under 35 U.S.C § 371 of International Application PCT/JP2007/06705 filed Aug. 31, 2007, and claims priority to JP2006-249910 filed Sep. 14, 2006, the entire contents of each of which are hereby incorporated herein by reference.

TECHNICAL FIELD

The invention relates to a Doppler very high frequency omnidirectional radio range (DVOR) monitoring apparatus which monitors an operation state of a DVOR apparatus and DVOR monitoring method. More specifically the present invention relates to a technique which improves an operation monitoring function of the DVOR apparatus.

BACKGROUND ART

Up to know, airports in each local area is provided with various facilities for supporting landing of an aircraft such as a passenger aircraft. The facilities include, for example, a DVOR apparatus. The DVOR apparatus supplies directional information to the aircraft via radio waves.

Meanwhile, to operate the DVOR apparatus, a stable operation is required. Therefore, in conventional, a monitoring apparatus has been used which receives a carrier and a subcarrier from the DVOR apparatus, analyzes phases of the carrier and the subcarrier then confirms the operation of the DVOR apparatus.

Now, in a case where a monitor antenna is disposed at a short distance of 60 m or shorter away from a DVOR signal transmission antenna, since the method using the monitoring apparatus brakes phase relationships between the carrier and the subcarrier, loses amplitude information of the subcarrier and cannot perform accurate monitor processing, the monitor antenna should be disposed at a location away from 60 m or longer away from the DVOR signal transmission antenna.

Thereby, in conventional, a method, which can dispose the monitor antenna at a short distance of 60 m or shorter away from the DVOR signal transmission antenna by elimination unnecessary amplitude fluctuation of a side-band signal to be generated in receiving the side-band signal at a position of a described distance by replacing the carrier with a new carrier including a phase delay equivalent to a phase delay of the side band signal, has been proposed (e.g., Jpn. Pat. Appln. KOKAI Publication No. 4-35715).

However, the method has to pre-store wave form data of the carrier including the phase delay, then, a memory capacity is consumed by the storage of the wave form data.

DISCLOSURE OF INVENTION

An object of the present invention is to provide a DVOR monitoring apparatus and a DVOR monitor method configured to achieve accurate monitor performance even if a monitor antenna is disposed at a short distance away from a DVOR signal transmission antenna.

The invention is configured as described below in order to establish the aforementioned object.

The DVOR monitoring apparatus is comprises a receiver which receives radio waves from a DVOR apparatus, the radio waves including a modulated carrier and a modulated subcarrier; a first signal extractor which extracts a signal of a carrier component from a reception signal obtained by the receiver; a second signal extractor which extracts a signal of a subcarrier component from the reception signal obtained by the receiver and shifts a phase of the signal of the subcarrier component by a phase difference equivalent to a prescribed distance away from the DVOR apparatus relative to the signal of the carrier component; a combiner which combines each output from the first and the second signal extractors; a demodulator which demodulates an output signal from the combiner; and a monitor unit which performs operation confirmation of the DVOR apparatus based on the signal obtained by the demodulator.

According to this configuration, the phase of the signal of the subcarrier component is shifted by the phase difference equivalent to the prescribed distance relative to the signal of the carrier component, the signals of the carrier component and the subcarrier component are combined to be output to the demodulator. Therefore, the monitor antenna is disposed at the short distance away from the DVOR signal transmission antenna without consuming the memory capacity by the reason that a memory with waveform data of the new carrier wave equivalent to a phase delay or a phase advance stored therein is not installed in advance, thereby, a space of land which is necessary for disposing the monitor antenna may be reduced.

BEST MODE FOR CARRYING OUT THE INVENTION

Hereinafter, embodiments regarding the invention will be described in detail with reference to the drawings.

Figure 1:
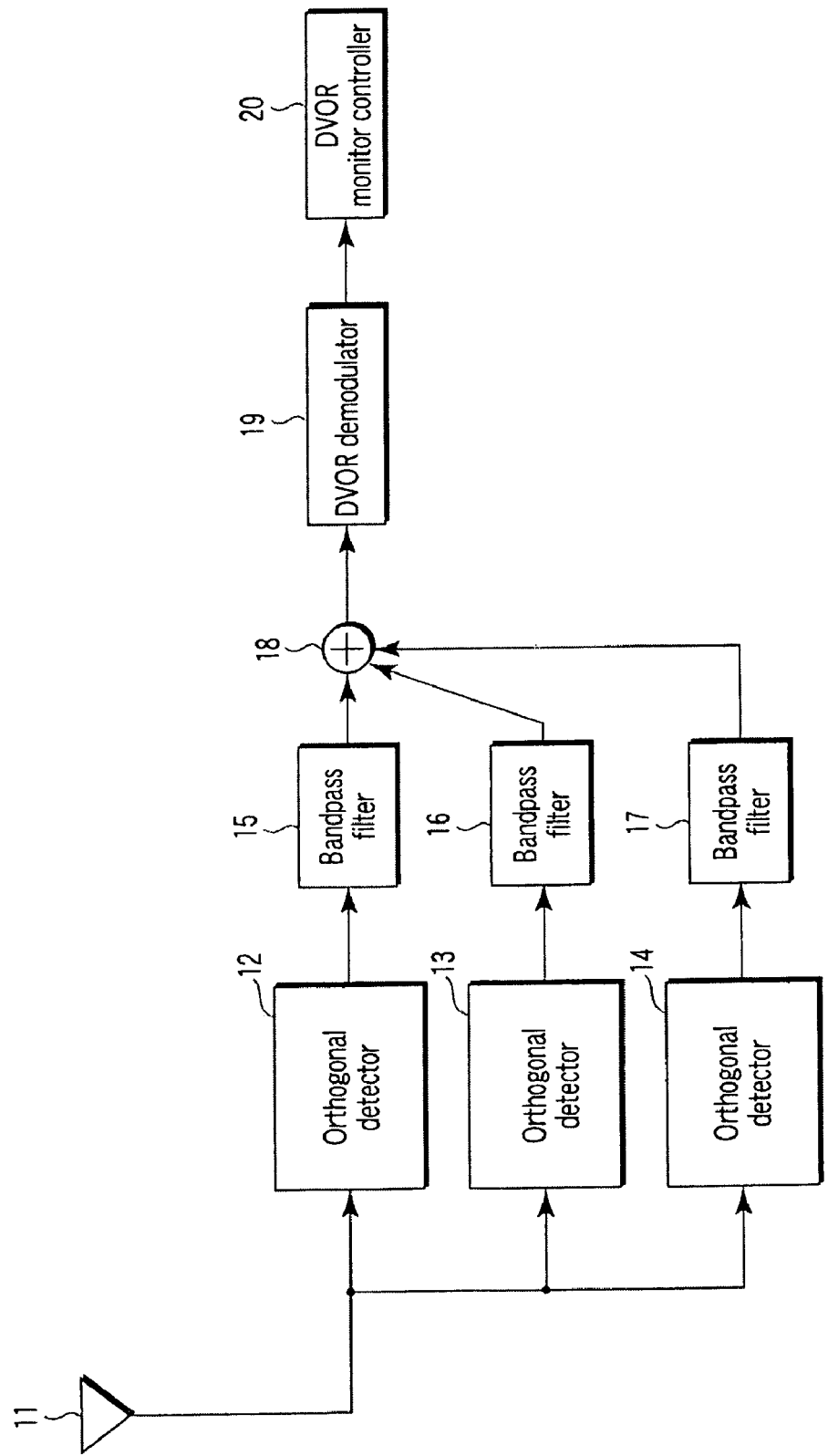
FIG. 1 is a block diagram depicting a configuration of a DVOR monitoring apparatus of an embodiment regarding the invention.

FIG. 1 shows a block diagram illustrating a configuration of a DVOR monitoring apparatus of an embodiment regarding the invention.

In FIG. 1, a DVOR signal from a DVOR apparatus (not shown) received by a monitor antenna 11 is distributed into three channels. One is supplied to an orthogonal detector 12 and the others are supplied to orthogonal detectors 13, 14, respectively.

The DVOR signal in a first channel is orthogonally detected by the orthogonal detector 12 to be frequency-converted into a reception intermediate frequency signal, then a signal of a carrier component is extracted through a bandpass filter (BPF1) 15.

The DVOR signal in a second channel is orthogonally detected by the orthogonal detector 13 to be frequency-converted into a reception intermediate frequency signal, its phase is advanced by a phase difference equivalent to a prescribed distance (60 m) from the DVOR apparatus relative to the signal of the carrier component, then a signal of a subcarrier component is extracted through a bandpass filter (BPF2) 16.

The DVOR signal in a third channel is orthogonally detected by the orthogonal detector 14 to be frequency-converted into a reception intermediate frequency signal, its phase is delayed by the phase difference equivalent to the prescribed distance (60 m) from the DVOR apparatus relative to the signal of the carrier component, then the signal of the subcarrier component is extracted through a bandpass filter (BPF3) 17.

Each output from the bandpass filters 15, 16, 17 are combined by a combiner 18, demodulated by a DVOR demodulator 19, signal processing for confirming an operation of the DVOR apparatus is applied by a DVOR monitor controller 20. As regards a demodulation system, for example, a demodulation system corresponding to an amplitude modulation (AM) system is used.

Figure 2:
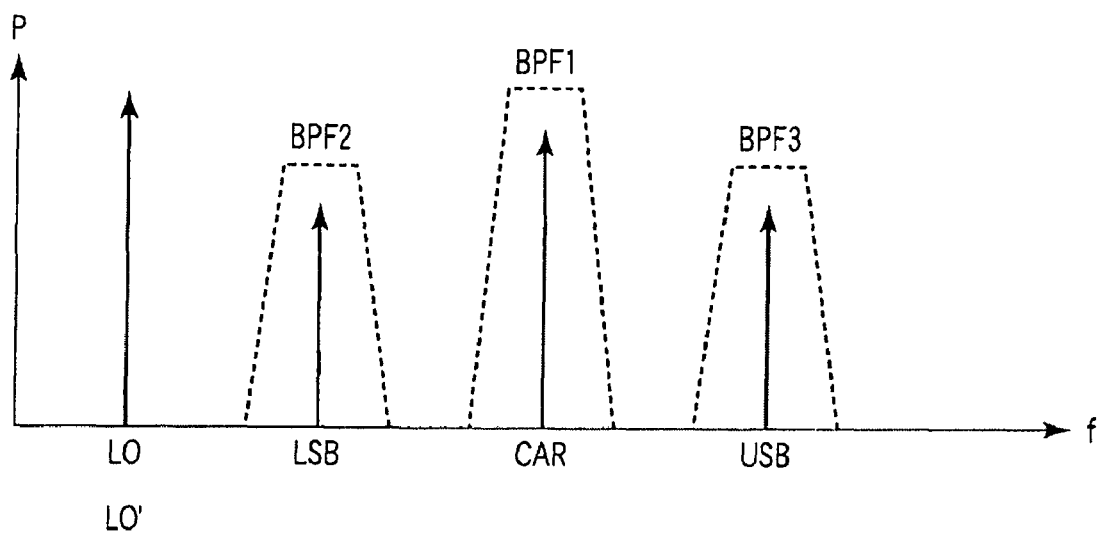
FIG. 2 is a spectrum waveform view for explaining a characteristic control method of a bandpass filter of the embodiment.

In the foregoing configuration, hereinafter, the processing operation will be described with reference to FIG. 2.

Firstly, to realize accurate monitor processing by the DVOR monitor controller 20, the three orthogonal detectors 12, 13, 14 frequency-converts the DVOR signal received by the monitor antenna 11, to give local signals of the orthogonal detectors 13, 14 a phase difference between a carrier and a subcarrier to be generated depending on a disposed distance of the monitor antenna 11, so that the carrier and the subcarrier from which phase errors are removed are output individually.

At this moment, center frequencies of the bandpass filters 15, 16, 17 are accorded with a frequency which is higher the a local frequency (LO) according with spectra (LSB), (CAR), (USB). Thereby, by combining the signal component extracted from the bandpass filters 15, 16, 17 through the combiner 18, monitor performance, which is equivalent to that of a case in which the monitor antenna 11 is disposed at a long distance through conventional demodulation processing, may be achieved.

As mentioned above, according to the embodiment given above, the orthogonal detectors 12, 13, 14 shift the signal of each subcarrier component by the phase difference equivalent to the prescribed distance away from the DVOR apparatus relative to the signal of the carrier component, and the combiner 18 combines the signals of the carrier component and the subcarrier component to output the combines signal to a DVOR demodulator 19.

Thus, since the DVOR monitoring apparatus does not include the memory with the waveform data of the new carrier equivalent to the phase delay and the phase advance of the carrier wave pre-stored therein, the apparatus does not consume the memory capacity, and may dispose the monitor antenna 11 at the sort distance away from the DVOR signal transmission antenna of the DVOR apparatus. Thereby, the space of the land required to dispose the monitor antenna 11 may be reduced, and the monitor antenna 11 may be disposed at any place.

While the invention has described on the basis of the foregoing embodiment, the invention is not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above.

The invention claimed is:

1. A Doppler very high frequency omnidirectional range (DVOR) monitoring apparatus, comprising:
a receiver which receives radio waves from a DVOR apparatus, the radio waves including a modulated carrier and a modulated subcarrier;
a first signal extractor which extracts a signal of a carrier component from a reception signal obtained by the receiver;
a second signal extractor which extracts a signal of a subcarrier component from the reception signal obtained by the receiver and shifts a phase of the signal of the subcarrier component by a phase difference equivalent to a prescribed distance away from the DVOR apparatus relative to the signal of the carrier component;
a combiner which combines each output from the first and the second signal extractors;
a demodulator which demodulates an output signal from the combiner; and
a monitor unit which performs operation confirmation of the DVOR apparatus based on the signal obtained by the demodulator, wherein:
the first signal extractor comprises a frequency converter to perform frequency-converting of the reception signal obtained by the receiver into a reception intermediate frequency signal including a local frequency which is lower than the carrier component and the subcarrier component, and a first bandpass filter through which the reception intermediate frequency signal is passed; and
the second signal extractor comprises a frequency converter to perform frequency-converting of the reception signal obtained by the receiver into a reception intermediate frequency signal, a phase shifter to shift a phase of the reception intermediate frequency signal by the phase difference, and a second bandpass filter differing in a passing band from the first bandpass filter and through which the reception intermediate frequency signal is passed.

2. A Doppler very high frequency omnidirectional range (DVOR) monitoring apparatus, comprising:
a receiver which receives radio waves from a DVOR apparatus, the radio waves including a modulated carrier and a modulated subcarrier;
a first signal extractor which extracts a signal of a carrier component from a reception signal obtained by the receiver;
a second signal extractor which extracts a signal of a subcarrier component from the reception signal obtained by the receiver and advances a phase of the signal of the subcarrier component by a phase difference equivalent to a prescribed distance away from the DVOR apparatus relative to the signal of the carrier component;
a third signal extractor which extracts the signal of the subcarrier component from the reception signal obtained by the receiver, and delays the phase of the signal of the subcarrier component by the phase difference equivalent to the prescribed distance from the DVOR apparatus relative to the signal of the carrier component;
a combiner which combines each output from the first, the second and the third signal extractors;
a demodulator which demodulates an output signal from the combiner; and
a monitor unit which performs operation confirmation of the DVOR apparatus based on the signal obtained by the demodulator, wherein:
the first signal extractor comprises a frequency converter to perform frequency-converting of the reception signal obtained by the receiver into a reception intermediate frequency signal including a local frequency which is lower than the carrier component and the subcarrier component, and a first bandpass filter through which the reception intermediate frequency is passed;

the second signal extractor comprises a frequency converter to perform frequency-converting of the reception signal obtained by the receiver into a reception intermediate frequency signal, a phase advancer to advance a phase of the reception intermediate frequency signal by the phase difference, and a second bandpass differing in a pass band from the first bandpass filter and through which is passed the reception intermediate frequency signal; and the third signal extractor comprises a frequency converter to perform frequency-converting of the reception signal obtained by the receiver into a reception intermediate frequency signal, a phase delayer to delay a phase of the reception intermediate frequency signal by the phase difference, and a third bandpass filter differing in pass band from the first bandpass filter and through which is passed the reception intermediate frequency signal.

3. A Doppler very high frequency omnidirectional radio range (DVOR) monitor method which receives radio waves including a modulated carrier and a modulated subcarrier from a DVOR apparatus, and performs operation confirmation of the DVOR apparatus from a signal obtained by demodulating the reception signal by a demodulator, comprising frequency-converting the reception signal into a reception intermediate frequency signal including a local frequency which is lower than the carrier component and the subcarrier component, shifting a phase of the reception intermediate frequency signal into which the reception signal is frequency-converted, by a phase difference equivalent to a prescribed distance from the DVOR apparatus to obtain a shifted reception intermediate frequency signal, extracting a signal of a carrier component by passing the reception intermediate frequency signal into which the reception signal is frequency-converted, through a first bandpass filter, extracting a signal of a subcarrier component by passing the reception intermediate frequency signal the phase of which is shifted, through a second bandpass filter differing in a passing band from the first bandpass filter, and combining the signals of the carrier component and the subcarrier component to output the combined signal to the demodulator.

\* \* \* \* \*